United States Patent
Wang et al.

(10) Patent No.: US 11,678,326 B2
(45) Date of Patent: Jun. 13, 2023

(54) MULTI-ACCESS POINT UPLINK COLLABORATION

(71) Applicant: MediaTek Singapore Pte. Ltd., Singapore (SG)

(72) Inventors: James June-Ming Wang, San Jose, CA (US); Yongho Seok, San Jose, CA (US); James Chih-Shi Yee, San Jose, CA (US); Jianhan Liu, San Jose, CA (US); Thomas Edward Pare, Jr., San Jose, CA (US)

(73) Assignee: MediaTek Singapore Pte. Ltd., Singapore (SG)

( * ) Notice: Subject to any disclaimer, the term of this patent is extended or adjusted under 35 U.S.C. 154(b) by 141 days.

(21) Appl. No.: 16/924,177

(22) Filed: Jul. 9, 2020

(65) Prior Publication Data

US 2021/0014853 A1    Jan. 14, 2021

Related U.S. Application Data

(60) Provisional application No. 62/873,360, filed on Jul. 12, 2019.

(51) Int. Cl.
| | |
|---|---|
| *H04W 48/16* | (2009.01) |
| *H04W 72/21* | (2023.01) |
| *H04W 88/08* | (2009.01) |
| *H04W 74/08* | (2009.01) |
| *H04W 52/24* | (2009.01) |
| *H04W 72/23* | (2023.01) |
| *H04W 72/541* | (2023.01) |

(52) U.S. Cl.
CPC ............ *H04W 72/21* (2023.01); *H04W 48/16* (2013.01); *H04W 52/243* (2013.01); *H04W 72/23* (2023.01); *H04W 72/541* (2023.01); *H04W 74/0816* (2013.01); *H04W 88/08* (2013.01)

(58) Field of Classification Search
CPC ............. H04W 72/0413; H04W 48/16; H04W 52/243; H04W 72/042; H04W 72/082; H04W 74/0816; H04W 88/08; H04W 72/21; H04W 72/541; H04W 72/23
See application file for complete search history.

(56) References Cited

U.S. PATENT DOCUMENTS

| | | | |
|---|---|---|---|
| 10,356,624 B2* | 7/2019 | Cariou | H04W 52/343 |
| 2017/0118725 A1* | 4/2017 | Chu | H04W 72/0473 |
| 2017/0188368 A1* | 6/2017 | Cariou | H04L 61/6022 |
| 2017/0325202 A1* | 11/2017 | Verma | H04L 27/2601 |
| 2017/0367129 A1* | 12/2017 | Yang | H04L 43/10 |
| 2018/0027573 A1* | 1/2018 | Cariou | H04W 52/367 |
| | | | 370/329 |
| 2018/0084554 A1* | 3/2018 | Chu | H04L 5/0007 |
| 2018/0227952 A1* | 8/2018 | Kim | H04W 74/0816 |
| 2018/0242331 A1* | 8/2018 | Zhu | H04B 7/0697 |
| 2018/0249501 A1* | 8/2018 | Ko | H04B 17/318 |

(Continued)

*Primary Examiner* — Michael J Moore, Jr.
(74) *Attorney, Agent, or Firm* — Han IP PLLC; Andy M. Han

(57) ABSTRACT

A first access point (AP) receives a second spatial reuse parameter (SRP) related to a second AP from the second AP. The first AP transmits the second SRP to at least a first communication device associated with the first apparatus. The first AP then receives a uplink (UL) transmission from the first communication device with a transmit power of the UL transmission controlled based on the second SRP.

20 Claims, 13 Drawing Sheets

(56) References Cited

U.S. PATENT DOCUMENTS

| | | | |
|---|---|---|---|
| 2018/0324596 A1* | 11/2018 | Xiang | H04W 74/0816 |
| 2019/0288767 A1* | 9/2019 | Wang | H04J 11/0056 |
| 2020/0077273 A1* | 3/2020 | Cherian | H04W 74/002 |
| 2021/0014853 A1* | 1/2021 | Wang | H04W 52/243 |
| 2021/0075566 A1* | 3/2021 | Guo | H04W 72/0413 |
| 2021/0120427 A1* | 4/2021 | Wang | H04W 52/04 |

* cited by examiner

1000

RECEIVE, BY A PROCESSOR OF A FIRST APPARATUS IMPLEMENTED IN A FIRST ACCESS POINT (AP), A SECOND SPATIAL REUSE PARAMETER (SRP) RELATED TO A SECOND APPARATUS FROM THE SECOND APPARATUS IMPLEMENTED IN A SECOND AP
1010

TRANSMIT, BY THE PROCESSOR, THE SECOND SRP TO AT LEAST A FIRST COMMUNICATION DEVICES ASSOCIATED WITH THE FIRST APPARATUS
1020

RECEIVE, BY THE PROCESSOR, A UPLINK (UL) TRANSMISSION FROM THE FIRST COMMUNICATION DEVICE WITH A TRANSMIT POWER OF THE UL TRANSMISSION CONTROLLED BASED ON THE SECOND SRP
1030

RESERVE, BY A PROCESSOR OF A FIRST APPARATUS IMPLEMENTED IN A FIRST ACCESS POINT (AP), A FIRST DEDICATED RESOURCE UNIT (RU)
1110

TRANSMIT, BY THE PROCESSOR, A FIRST SPATIAL REUSE PARAMETER (SRP) RELATED TO THE FIRST APPARATUS TO AT LEAST A SECOND COMMUNICATION DEVICES ASSOCIATED WITH A SECOND APPARATUS IMPLEMENTED IN A SECOND AP USING THE FIRST DEDICATED RU
1120

RECEIVE, BY THE PROCESSOR, A UPLINK (UL) TRANSMISSION FROM A FIRST COMMUNICATION DEVICE ASSOCIATED WITH THE FIRST APPARATUS WITH A TRANSMIT POWER OF THE UL TRANSMISSION CONTROLLED BASED ON A SECOND SRP RELATED TO THE SECOND APPARATUS
1130

RECEIVE, BY A PROCESSOR OF A COMMUNICATION DEVICE, A SECOND SPATIAL REUSE PARAMETER (SRP) RELATED TO A SECOND APPARATUS FROM A FIRST APPARATUS TO WHICH THE COMMUNICATION DEVICE IS ASSOCIATED
1210

PERFORM, BY THE PROCESSOR, A UPLINK (UL) TRANSMISSION TO THE FIRST APPARATUS BY CONTROLLING A TRANSMIT POWER OF THE UL TRANSMISSION BASED ON THE SECOND SRP
1220

RESERVE, BY A PROCESSOR OF A FIRST APPARATUS IMPLEMENTED IN A FIRST ACCESS POINT (AP), A FIRST DEDICATED RESOURCE UNIT (RU)
1310

DIVIDE A PLURALITY OF RUs INTO A GROUP OF ONE OR MORE SHARED RUs AND A GROUP OF ONE OR MORE DEDICATED RUs COMPRISING THE FIRST DEDICATED RU
1312

ALLOCATE THE GROUP OF ONE OR MORE SHARED RUs, THE GROUP OF ONE OR MORE DEDICATED RUs, OR BOTH THE GROUP OF ONE OR MORE SHARED RUs AND THE GROUP OF ONE OR MORE DEDICATED RUs TO AT LEAST A FIRST COMMUNICATION DEVICE
1314

FIG. 13 a non-provisional patent application claiming the priority benefit of U.S. Provisional Patent Application No. 62/873,360, filed on 12 Jul. 2019, the content of which being incorporated by reference in its entirety.

TECHNICAL FIELD

The present disclosure is generally related to wireless communications and, more particularly, to multi-access point uplink collaboration.

BACKGROUND

Unless otherwise indicated herein, approaches described in this section are not prior art to the claims listed below and are not admitted as prior art by inclusion in this section.

In wireless communications, such as wireless communications in a wireless local area network (WLAN) in compliance with the Institute of Electrical and Electronics Engineers (IEEE) 802.11 standard(s), joint multi-access point (multi-AP) uplink (UL) transmissions from a plurality of stations (STAs) to two or more APs tend to result in STA-to-overlapping basic service set (STA-to-OBSS) AP interference. Therefore, there is a need for a solution to enhance multi-AP UL transmission to improve overall network throughput.

SUMMARY

The following summary is illustrative only and is not intended to be limiting in any way. That is, the following summary is provided to introduce concepts, highlights, benefits and advantages of the novel and non-obvious techniques described herein. Select implementations are further described below in the detailed description. Thus, the following summary is not intended to identify essential features of the claimed subject matter, nor is it intended for use in determining the scope of the claimed subject matter.

An objective of the present disclosure is to provide schemes, concepts, designs, techniques, methods and apparatuses pertaining to multi-AP UL collaboration. Under various proposed schemes in accordance with the present disclosure, the aforementioned issues of STA-to-OBSS AP interference may be avoided or otherwise alleviated.

In one aspect, a method may involve a processor of a first apparatus implemented in a first AP receiving a second spatial reuse parameter (SRP) related to a second apparatus from the second apparatus implemented in a second AP. The method may also involve the processor transmitting the second SRP to at least a first communication device associated with the first apparatus. The method may further involve the processor receiving a UL transmission from the first communication device with a transmit power of the UL transmission controlled based on the second SRP.

In another aspect, a method may involve a processor of a first apparatus implemented in a first AP reserving a first dedicated resource unit (RU). The method may also involve the processor transmitting a first SRP related to the first apparatus to at least a second communication device associated with a second apparatus implemented in a second AP using the first dedicated RU. The method may further involve the processor receiving a UL transmission from a first communication device associated with the first apparatus with a transmit power of the UL transmission controlled based on a second SRP related to the second apparatus.

In still another aspect, a method may involve a processor of a first apparatus implemented in a first AP reserving a first dedicated RU by: (a) dividing a plurality of RUs into a group of one or more shared RUs and a group of one or more dedicated RUs comprising the first dedicated RU, and (b) allocating the group of one or more shared RUs, the group of one or more dedicated RUs, or both the group of one or more shared RUs and the group of one or more dedicated RUs to at least a first communication device.

In yet another aspect, a method may involve a processor of a communication device receiving a second SRP related to a second apparatus from a first apparatus to which the communication device is associated. The method may also involve the processor performing a UL transmission to the first apparatus by controlling a transmit power of the UL transmission based on the second SRP.

It is noteworthy that, although description provided herein may be in the context of certain radio access technologies, networks and network topologies such as, Wi-Fi, the proposed concepts, schemes and any variation(s)/derivative(s) thereof may be implemented in, for and by other types of radio access technologies, networks and network topologies such as, for example and without limitation, Bluetooth, ZigBee, $5^{th}$ Generation (5G)/New Radio (NR), Long-Term Evolution (LTE), LTE-Advanced, LTE-Advanced Pro, Internet-of-Things (IoT), Industrial IoT (IoT) and narrowband IoT (NB-IoT). Thus, the scope of the present disclosure is not limited to the examples described herein.

BRIEF DESCRIPTION OF THE DRAWINGS

The accompanying drawings are included to provide a further understanding of the disclosure and are incorporated in and constitute a part of the present disclosure. The drawings illustrate implementations of the disclosure and, together with the description, serve to explain the principles of the disclosure. It is appreciable that the drawings are not necessarily in scale as some components may be shown to be out of proportion than the size in actual implementation to clearly illustrate the concept of the present disclosure.

FIG. 10 is a flowchart of an example process in accordance with an implementation of the present disclosure.

FIG. 11 is a flowchart of an example process in accordance with an implementation of the present disclosure.

FIG. 12 is a flowchart of an example process in accordance with an implementation of the present disclosure.

FIG. 13 is a flowchart of an example process in accordance with an implementation of the present disclosure.

DETAILED DESCRIPTION OF PREFERRED EMBODIMENTS

Detailed embodiments and implementations of the claimed subject matters are disclosed herein. However, it shall be understood that the disclosed embodiments and implementations are merely illustrative of the claimed subject matters which may be embodied in various forms. The present disclosure may, however, be embodied in many different forms and should not be construed as limited to the exemplary embodiments and implementations set forth herein. Rather, these exemplary embodiments and implementations are provided so that description of the present disclosure is thorough and complete and will fully convey the scope of the present disclosure to those skilled in the art. In the description below, details of well-known features and techniques may be omitted to avoid unnecessarily obscuring the presented embodiments and implementations.

Overview

Implementations in accordance with the present disclosure relate to various techniques, methods, schemes and/or solutions pertaining to multi-AP UL collaboration in wireless communications. According to the present disclosure, a number of possible solutions may be implemented separately or jointly. That is, although these possible solutions may be described below separately, two or more of these possible solutions may be implemented in one combination or another.

Figure 1:
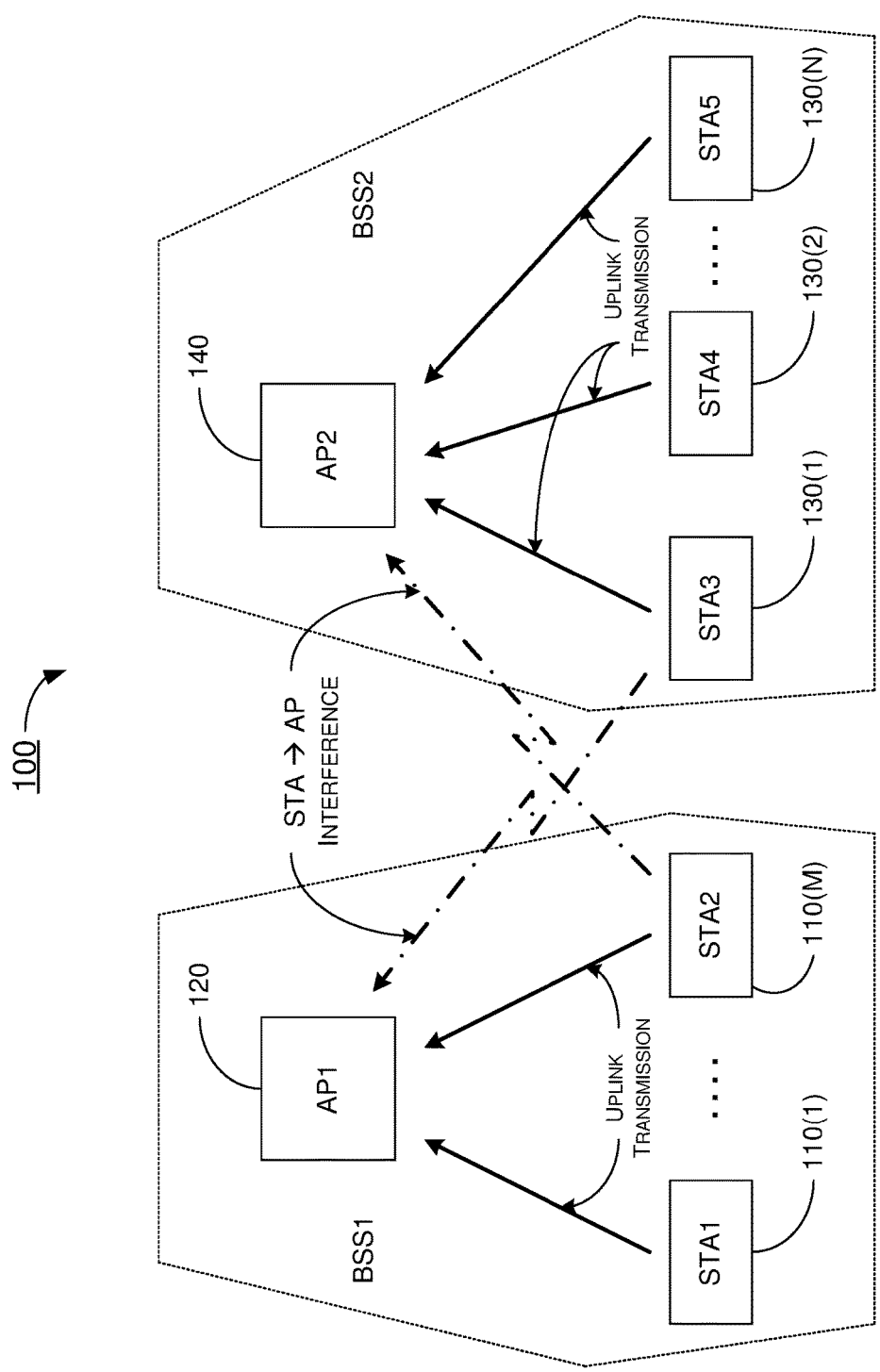
FIG. 1 is a diagram of an example network environment in which various solutions and schemes in accordance with the present disclosure may be implemented.

FIG. 1 illustrates an example network environment 100 in which various solutions and schemes in accordance with the present disclosure may be implemented. FIG. 2~FIG. 8 illustrate examples of implementation of various proposed schemes in network environment 100 in accordance with the present disclosure. The following description of various proposed schemes is provided with reference to FIG. 1~FIG. 8.

Referring to FIG. 1, network environment 100 may involve a first plurality of STAs 110(1)~110(M) (herein interchangeably referred to and shown in figures as "STA1" and "STA2") communicating wirelessly with a first AP 120 (herein interchangeably referred to and shown in figures as "AP1") and a second plurality of STAs 130(1)~130(N) (herein interchangeably referred to and shown in figures as "STA3", "STA4" and "STA5") communicating wirelessly with a second AP 140 (herein interchangeably referred to and shown in figures as "AP2") in accordance with one or more IEEE 802.11 standards. Here, each of M and N is a positive integer greater than or equal to 1. In network environment 100, STAs 110(1)~110(M) and AP 120 may be in a first basic service set (BSS), or BSS1. Similarly, STAs 130(1)~130(N) and AP 140 may be in a second BSS, or BSS2. Under various proposed schemes in accordance with the present disclosure, one or more of STAs 110(1)~110(N), one or more of STAs 130(1)~130(N), AP 120 and AP 140 may be configured to perform multi-AP UL collaboration in wireless communications in accordance with various proposed schemes described below.

With respect to mitigation of the aforementioned interference issue associated with multi-AP UL transmissions, some possible approaches may include joint UL multi-user multi-input-and-multi-output (MU-MIMO), joint UL orthogonal frequency-division multiple access (OFDMA), and STA transmit-power control. However, there are some drawbacks associated with each of these approaches. For instance, the joint UL MU-MIMO approach would not only require STAs to have multiple antennas but also require the STAs to have channel information of all collaborative Aps. This would result in high overhead (in terms of the number of UL STAs multiplied by the amount of channel information). Similarly, the joint UL OFDMA approach would require that overall RUs be divided among BSSs with each BSS using its dedicated RUs, thus requiring coordination of RU assignment among the BSSs. Besides, UL timing synchronization would be required. Consequently, there would be no net UL throughput improvement (compared to a single AP scenario). As for the STA transmit-power control approach, it would require each STA to adjust its transmit power to be below an acceptable interference level of an OBSS AP.

Figure 2:
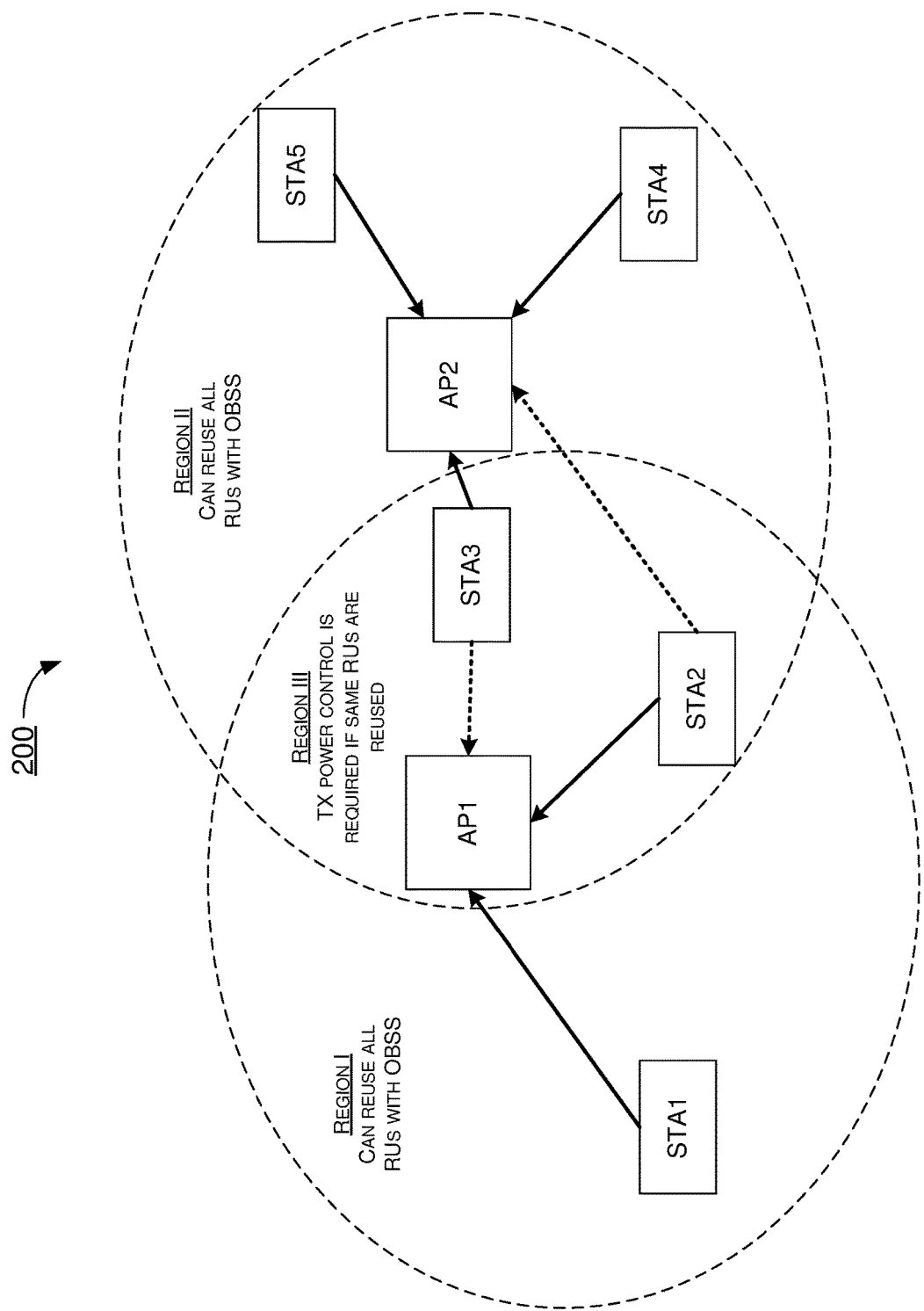
FIG. 2 is a diagram of an example scenario in accordance with the present disclosure.

FIG. 2 illustrates an example scenario 200 of multi-AP UL frequency and/or spatial reuse in accordance with the present disclosure. In scenario 200, UL MU-MIMO is not utilized or otherwise implemented. In scenario 200, the STA(s) in region I and region III can reuse the same RUs with OBSS. In case a STA in region II reuses the same RUs with OBSS, transmit-power control by that STA to control or otherwise mitigate interference on the OBSS AP may be required. Accordingly, increased aggregate UL throughput may be achieved. Referring to FIG. 2, STA1 is in region I, STA 2 and STA3 are in region II, and STA4 and STA5 are in region III. That is, AP2 is the OBSS AP with respect to STA2 and AP1 is the OBSS AP with respect to STA3. Put differently, STA2 is the OBSS STA with respect to AP2 and STA3 is the OBSS STA with respect to AP1. Thus, each of STA2 and STA3 may control its transmit power to avoid or otherwise minimize interference on its respective OBSS AP.

Figure 3:
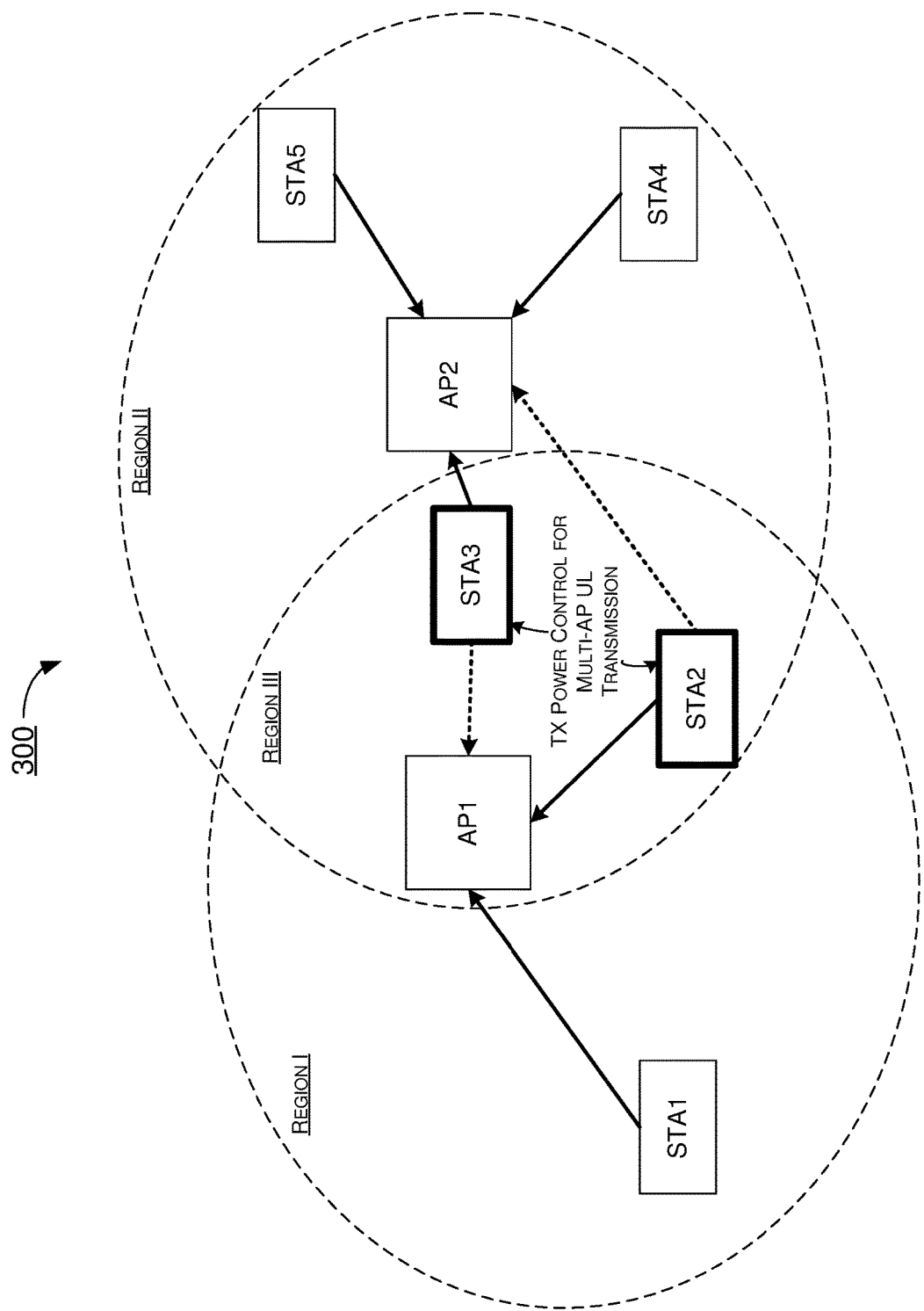
FIG. 3 is a diagram of an example scenario in accordance with the present disclosure.

FIG. 3 illustrates an example scenario 300 of transmit-power control for multi-AP UL transmissions in accordance with the present disclosure. In scenario 300, transmit-power control may be utilized in UL OFDMA. To avoid interference on OBSS AP in multi-AP UL transmissions, a STA may adjust its transmit (TX) power to be lower than a SRP of the OBSS AP by an amount equal to the received power of the OBSS AP at the STA, expressed as follows:

$$\text{STA's TX power} < \text{SRP}_{OBSS\ AP} - \text{Received Power of OBSS AP@STA}$$

$$\text{SRP}_{OBSS\ AP} = \text{TX Power}_{OBSS\ AP} + \text{Acceptable Receiver Interference Level}_{OBSS\ AP}$$

As a result, the interference at the OBSS AP may be less than the acceptable receiver interference level. For instance, with TX Power$_{OBSS\ AP}$ being at 20 dBm and Acceptable Receiver Interference Level$_{OBSS\ AP}$ being at 3 dBm, SRP$_{OBSS\ AP}$ may be determined to be 23 dBm. Accordingly, with Received Power of OBSS AP @ STA being at 10 dBm, the STA may control its TX power to be less than 13 dBm (=23 dBm−10 dBm).

Figure 4:
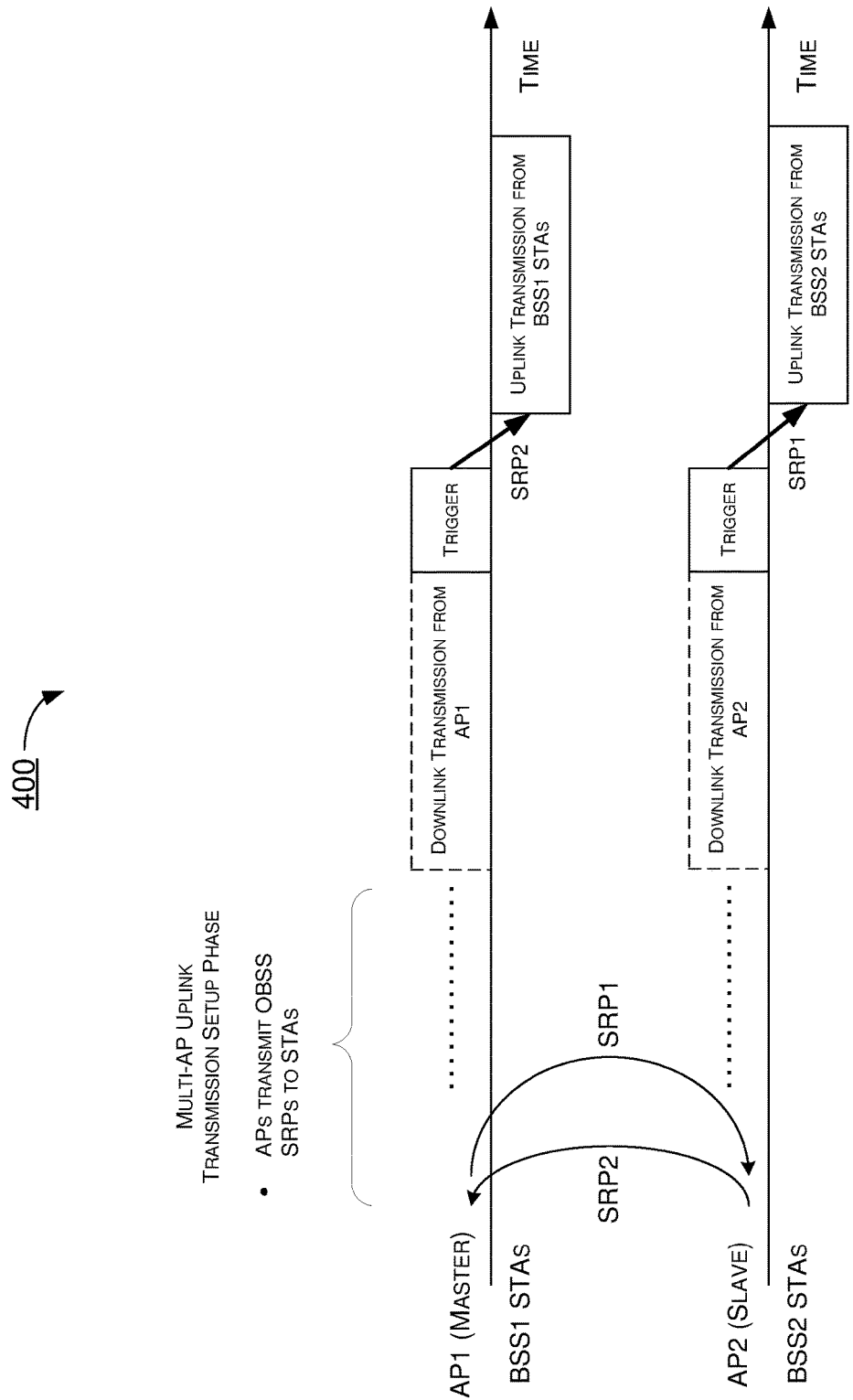
FIG. 4 is a diagram of an example scenario in accordance with the present disclosure.

Under a proposed scheme of multi-AP UL TX power control in accordance with the present disclosure, AP1 and AP2 may exchange SRPs during a multi-AP UL transmission setup phase. FIG. 4 illustrates an example scenario 400 in accordance with the proposed scheme. Referring to FIG. 4, after exchanging their SRPs (namely, SRP1 of AP1 and SRP2 of AP2), AP1 and AP2 may transmit SRP2 and SRP1 to their associated STAs, respectively. Each STA may measure the received power of its respective OBSS AP during a joint AP-AP transmission setup phase (as part of a multi-AP UL transmission setup phase) or other OBSS transmissions (e.g., beacons from OBSS AP(s)). Accordingly, each STA may implement TX power control during UL transmission to reduce or otherwise minimize its interference on its respective OBSS AP. It is noteworthy that STA(s) in region I and region III may not be affected by UL OBSS transmit power control.

Figure 5:
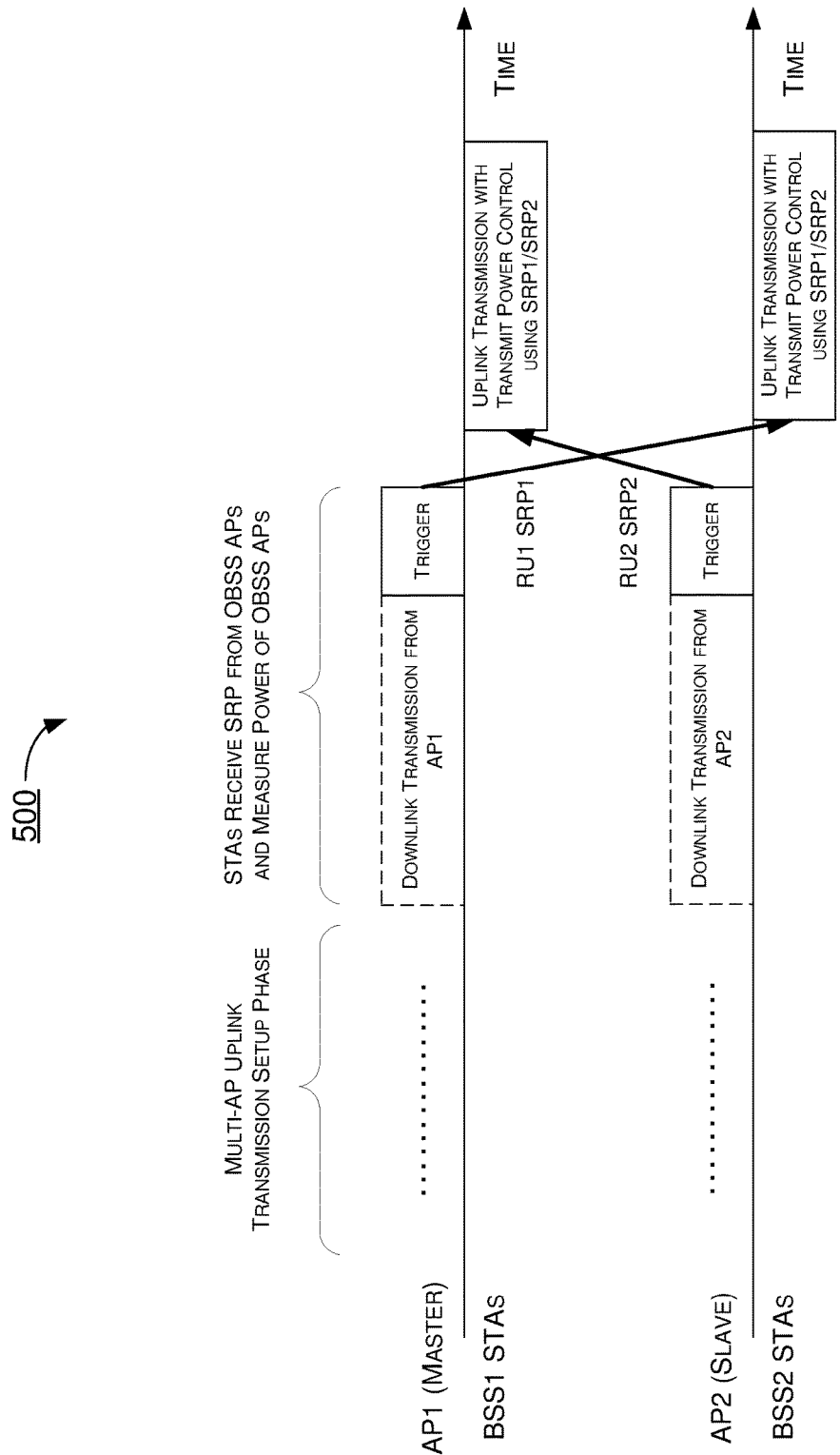
FIG. 5 is a diagram of an example scenario in accordance with the present disclosure.

Under another proposed scheme of multi-AP UL TX power control in accordance with the present disclosure, AP1 and AP2 may reserve two dedicated RUs (e.g., RU1 and RU2) for signaling. FIG. 5 illustrates an example scenario 500 in accordance with the proposed scheme. Referring to FIG. 5, AP1 may use the dedicated downlink (DL) RU1 to transmit SRP1 to OBSS STA(s) in BSS2 to allow the OBSS STA(s) to measure the received power of AP1. Likewise, AP2 may use the dedicated DL RU2 to transmit SRP2 to OBSS STA(s) in BSS1 to allow the OBSS STA(s) to measure the received power of AP2. Accordingly, the STAs may utilize the SRPs to perform TX power control during UL transmissions.

Under a proposed scheme of RU assignment for multi-AP UL transmissions in accordance with the present disclosure, collaborative APs (e.g., AP1 and AP2) may divide RUs into multiple groups including one or more groups of dedicated RUs and a group of shared RUs. Each group of dedicated RUs may be used by a single BSS while the group of shared RUs may be reused by more than one BSS for spatial reuse. Under the proposed scheme, each of AP1 and AP2 may assign or otherwise allocate dedicated and/or shared RU(s) to each of its associated STAs. Before each AP assigns RUs in each transmit opportunity (TXOP), the AP may optionally poll its associated STAs at the beginning of a TXOP to check if the STAs may meet the target received signal strength indicator (RSSI) and/or OBSS SRP requirements for better RU assignment. Each AP may also allocate shared RU(s) based on prior knowledge or may allocate shared RU(s) opportunistically (dynamically). Under the proposed scheme, with respect to STA utilization of RUs, each STA may use a dedicated RU assigned to it as the first priority. Additionally, each STA may use a shared RU assigned to it in case both the target RSSI and OBSS SRP requirements can be met (e.g., the target RSSI meeting or exceeding a minimum RSSI threshold and the $SRP_{OBSS\_AP}$ being no less than the received power of the OBSS AP). Under the proposed scheme, dedicated RUs may be used to ensure that each STA can perform UL transmission, and usage of shared RUs may be allowed for frequency and/or spatial reuse.

Figure 6:
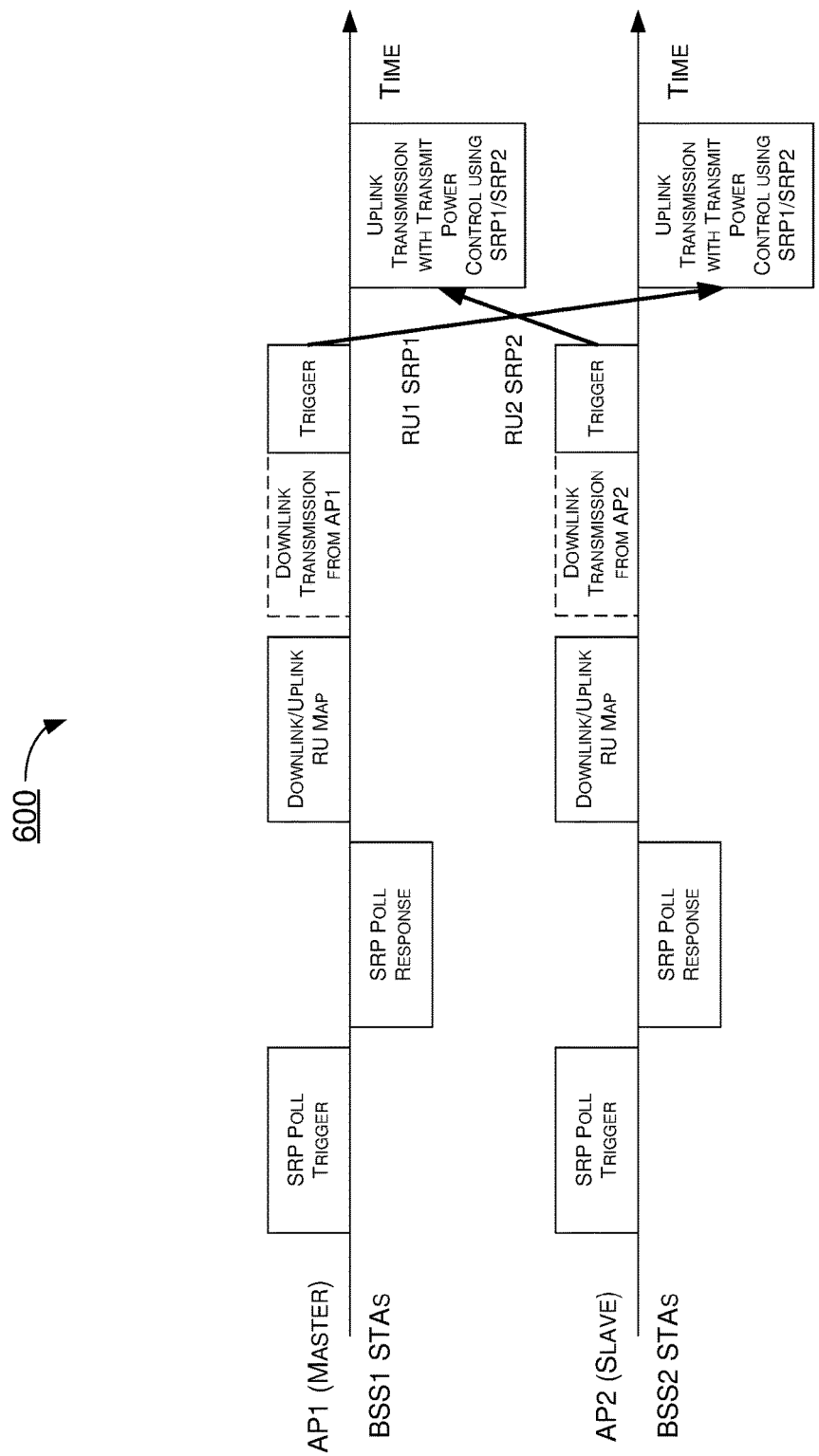
FIG. 6 is a diagram of an example scenario in accordance with the present disclosure.

FIG. 6 illustrates an example scenario 600 of RU assignment protocol for multi-AP UL transmissions in accordance with the proposed scheme. Referring to FIG. 6, an example RU assignment protocol frame exchange sequence between AP1 and AP2 is shown. In scenario 600, AP1 may be a "master" AP and AP2 may be a "slave" AP. Under the proposed scheme, a DL/UL RU map may specify the RU assignment for AP1 and AP2. For instance, an UL RU map may indicate the dedicated RUs of each of AP1 and AP2, and the UL RU map may also indicate the shared RU(s) that may be used for AP1 and AP2. After receiving a DL/UL map frame from the master AP (e.g., AP1), AP2 (as well as AP1) may use the appropriate RU(s) for DL and UL resource allocation. For instance, when AP1 transmits a trigger frame for STAs in BSS2, AP1 may allocate the dedicated RU(s) of AP1. Additionally, AP1 may allocate the shared RU(s) to STA(s) that responded with the SRP poll response. Moreover, AP1 may allocate the dedicated RU(s) of AP2 to STA(s) that did not respond with the SRP poll response.

Figure 7:
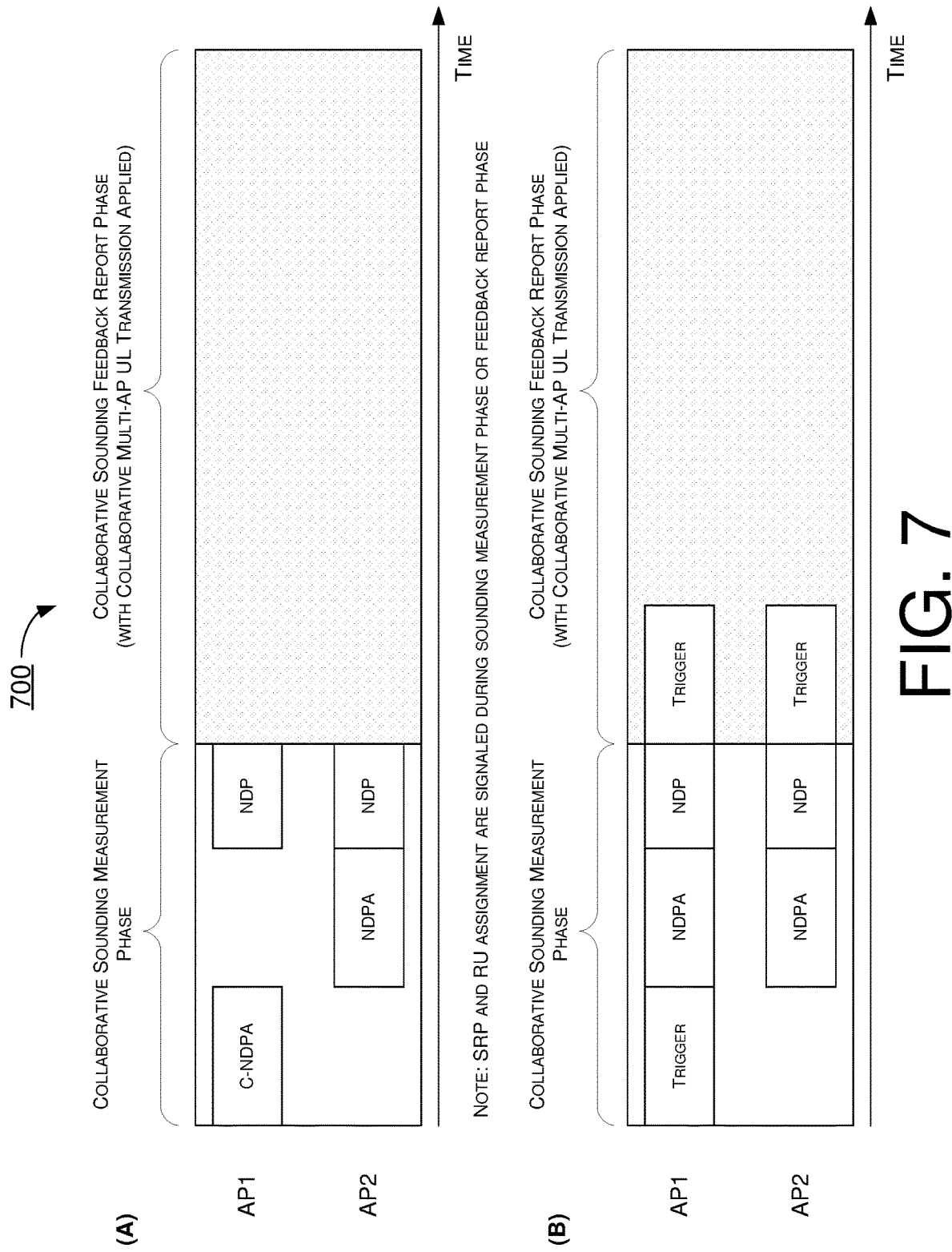
FIG. 7 is a diagram of an example scenario in accordance with the present disclosure.

FIG. 7 illustrates an example scenario 700 of MU-DL sounding and using collaborate multi-UL transmissions for feedbacks in accordance with the proposed scheme. In scenario 700, SRP and RU assignment may be signaled during a sounding measurement phase or during a feedback report phase. Part (A) of FIG. 7 shows an example of collaborative sounding measurement setups using the proposed schemes for multi-AP UL transmissions. During a collaborative sounding measurement phase, AP1 may first transmit a cooperative null data packet announcement (C-NDPA) and AP2 may then transmit a null data packet announcement (NDPA), followed by transmissions of null data packets (NDPs) by AP1 and AP2. During a collaborative sounding feedback report phase, AP1, AP2 and the STAs may apply one or more proposed schemes in multi-AP UL transmissions described above.

Part (B) of FIG. 7 shows another example of collaborative sounding measurement setups using the proposed schemes for multi-AP UL transmissions. During the collaborative sounding measurement phase, AP1 may first transmit a trigger and then AP1 and AP2 may respectively transmit a NDPA and a NDP. During the collaborative sounding feedback report phase, AP1 and AP2 may respectively transmit a trigger, and AP1, AP2 and the STAs may apply one or more proposed schemes in multi-AP UL transmissions described above.

Figure 8:
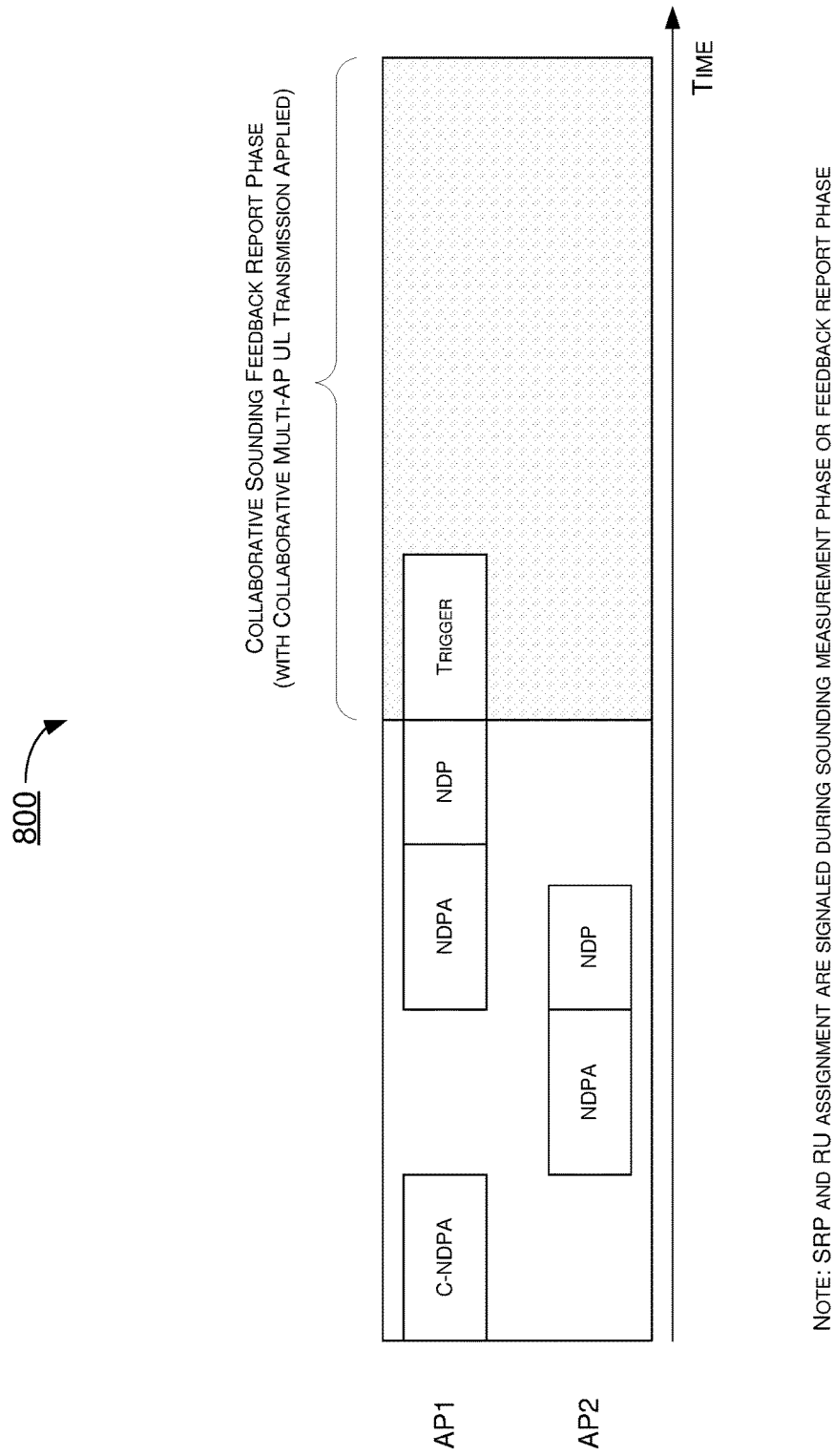
FIG. 8 is a diagram of an example scenario in accordance with the present disclosure.

FIG. 8 illustrates an example scenario 800 of MU-DL sounding and using collaborate multi-UL transmissions for feedbacks in accordance with the proposed scheme. In scenario 800, SRP and RU assignment may be signaled during a sounding measurement phase or during a feedback report phase. During a collaborative sounding measurement phase, AP1 may first transmit a C-NDPA and AP2 may then transmit a NDPA and a NDP, followed by transmission of a NDPA and a NDP by AP1. During a collaborative sounding feedback report phase, AP1 may transmit a trigger, and AP1, AP2 and the STAs may apply one or more proposed schemes in multi-AP UL transmissions described above.

In view of the above, OBSS TX power control under one or more of the proposed schemes may be utilized in multi-AP UL transmissions. Under the proposed schemes, a simple protocol may be utilized for exchange of SRPs and measurement of the TX power of an OBSS AP. It is believed that, by implementing one or more of the proposed schemes, improvement in aggregate UL throughput may be achieved. Moreover, one or more of the proposed schemes may be utilized independently or together with joint OFDMA to simplify UL RU allocation.

Illustrative Implementations

Figure 9:
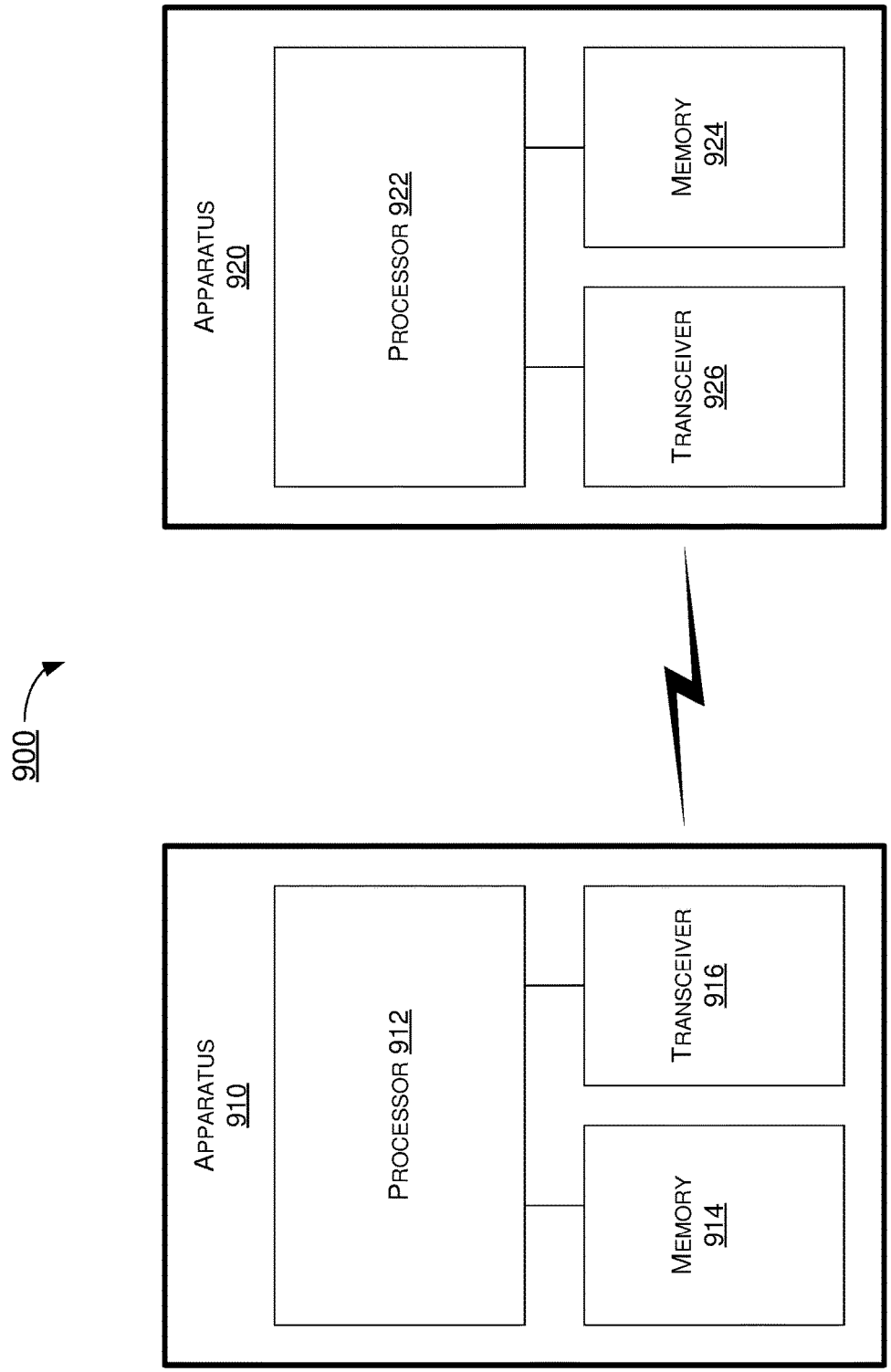
FIG. 9 is a block diagram of an example communication system in accordance with an implementation of the present disclosure.

FIG. 9 illustrates an example system 900 having at least an example apparatus 910 and an example apparatus 920 in accordance with an implementation of the present disclosure. Each of apparatus 910 and apparatus 920 may perform various functions to implement schemes, techniques, processes and methods described herein pertaining to multi-AP UL collaboration in wireless communications, including the various schemes described above with respect to various proposed designs, concepts, schemes, systems and methods described above as well as processes described below. For instance, each of apparatus 910 and apparatus 920 may be implemented in any of STAs 110(1)~110(M) (e.g., STA1 or STA2), AP 120 (e.g., AP1), STAs 130(1)~130(N) (e.g., STA3, STA4 or STA5) and AP 140 (e.g., AP2).

Each of apparatus 910 and apparatus 920 may be a part of an electronic apparatus, which may be a STA or an AP, such as a portable or mobile apparatus, a wearable apparatus, a wireless communication apparatus or a computing apparatus. When implemented in a STA, each of apparatus 910 and apparatus 920 may be implemented in a smartphone, a smart watch, a personal digital assistant, a digital camera, or a computing equipment such as a tablet computer, a laptop computer or a notebook computer. Each of apparatus 910 and apparatus 920 may also be a part of a machine type apparatus, which may be an IoT apparatus such as an immobile or a stationary apparatus, a home apparatus, a wire communication apparatus or a computing apparatus. For instance, each of apparatus 910 and apparatus 920 may be implemented in a smart thermostat, a smart fridge, a smart door lock, a wireless speaker or a home control center. When implemented in or as a network apparatus, apparatus 910 and/or apparatus 920 may be implemented in a network node, such as an AP in a WLAN.

In some implementations, each of apparatus 910 and apparatus 920 may be implemented in the form of one or more integrated-circuit (IC) chips such as, for example and without limitation, one or more single-core processors, one or more multi-core processors, one or more reduced-instruction set computing (RISC) processors, or one or more complex-instruction-set-computing (CISC) processors. In the various schemes described above, each of apparatus 910 and apparatus 920 may be implemented in or as a STA or an AP. Each of apparatus 910 and apparatus 920 may include at least some of those components shown in FIG. 9 such as a processor 912 and a processor 922, respectively, for example. Each of apparatus 910 and apparatus 920 may further include one or more other components not pertinent to the proposed scheme of the present disclosure (e.g., internal power supply, display device and/or user interface device), and, thus, such component(s) of apparatus 910 and apparatus 920 are neither shown in FIG. 9 nor described below in the interest of simplicity and brevity.

In one aspect, each of processor 912 and processor 922 may be implemented in the form of one or more single-core processors, one or more multi-core processors, one or more RISC processors or one or more CISC processors. That is, even though a singular term "a processor" is used herein to refer to processor 912 and processor 922, each of processor 912 and processor 922 may include multiple processors in some implementations and a single processor in other implementations in accordance with the present disclosure. In another aspect, each of processor 912 and processor 922 may be implemented in the form of hardware (and, optionally, firmware) with electronic components including, for example and without limitation, one or more transistors, one or more diodes, one or more capacitors, one or more resistors, one or more inductors, one or more memristors and/or one or more varactors that are configured and arranged to achieve specific purposes in accordance with the present disclosure. In other words, in at least some implementations, each of processor 912 and processor 922 is a special-purpose machine specifically designed, arranged and configured to perform specific tasks including those pertaining to multi-AP UL collaboration in wireless communications in accordance with various implementations of the present disclosure.

In some implementations, apparatus 910 may also include a transceiver 916 coupled to processor 912. Transceiver 916 may include a transmitter capable of wirelessly transmitting and a receiver capable of wirelessly receiving data. In some implementations, apparatus 920 may also include a transceiver 926 coupled to processor 922. Transceiver 926 may include a transmitter capable of wirelessly transmitting and a receiver capable of wirelessly receiving data.

In some implementations, apparatus 910 may further include a memory 914 coupled to processor 912 and capable of being accessed by processor 912 and storing data therein. In some implementations, apparatus 920 may further include a memory 924 coupled to processor 922 and capable of being accessed by processor 922 and storing data therein. Each of memory 914 and memory 924 may include a type of random-access memory (RAM) such as dynamic RAM (DRAM), static RAM (SRAM), thyristor RAM (T-RAM) and/or zero-capacitor RAM (Z-RAM). Alternatively, or additionally, each of memory 914 and memory 924 may include a type of read-only memory (ROM) such as mask ROM, programmable ROM (PROM), erasable programmable ROM (EPROM) and/or electrically erasable programmable ROM (EEPROM). Alternatively, or additionally, each of memory 914 and memory 924 may include a type of non-volatile random-access memory (NVRAM) such as flash memory, solid-state memory, ferroelectric RAM (Fe-RAM), magnetoresistive RAM (MRAM) and/or phase-change memory.

Each of apparatus 910 and apparatus 920 may be a communication entity capable of communicating with each other using various proposed schemes in accordance with the present disclosure. For illustrative purposes and without limitation, a description of capabilities of apparatus 910, as communication entity 110, and apparatus 920, as communication entity 120, is provided below. It is noteworthy that, although the example implementations described below are provided in the context of WLAN, the same may be implemented in other types of networks. Thus, although the following description of example implementations pertains to a scenario in which apparatus 910 functions as a transmitting device and apparatus 920 functions as a receiving device, the same is also applicable to another scenario in which apparatus 910 functions as a receiving device and apparatus 920 functions as a transmitting device.

Under a proposed scheme in accordance with the present disclosure, with apparatus 910 implemented in or as AP 120 (e.g., AP1 of BSS1) and apparatus 920 implemented in or as AP 140 (e.g., AP2 of BSS2) of a wireless network such as a WLAN in accordance with one or more of IEEE 802.11 standards, processor 912 of apparatus 910 may receive, via transceiver 916, a second SRP (e.g., SRP2) related to apparatus 920 from apparatus 920. Additionally, processor 912 may transmit, via transceiver 916, the second SRP to at least a first communication device (e.g., STA1 or STA2) associated with apparatus 910. Moreover, processor 912 may receive, via transceiver 916, a UL transmission from the first communication device with a transmit power of the UL transmission controlled based on the second SRP.

In some implementations, apparatus 910 may be associated with a first BSS (e.g., BSS1) to which the first communication device belongs, and apparatus 920 may be associated with a second BSS (e.g., BSS2). In such cases, apparatus 920 may be an OBSS AP with respect to the first communication device.

In some implementations, processor 912 may transmit, via transceiver 916, a first SRP (e.g., SRP1) related to apparatus 910 to apparatus 920.

In some implementations, processor 912 may perform other additional operations. For instance, processor 912 may reserve a first dedicated RU. Moreover, processor 912 may transmit, via transceiver 916, a first SRP (e.g., SRP1) related to apparatus 910 to at least a second communication device (e.g., STA3, STA4 or STA5) associated with apparatus 920 using the first dedicated RU. In such cases, apparatus 910 may be an OBSS AP with respect to the second communication device.

Under a proposed scheme in accordance with the present disclosure, with apparatus 910 implemented in or as AP 120 (e.g., AP1 of BSS1) and apparatus 920 implemented in or as AP 140 (e.g., AP2 of BSS2) of a wireless network such as a WLAN in accordance with one or more of IEEE 802.11 standards, processor 912 of apparatus 910 may reserve a first dedicated RU. Moreover, processor 912 may transmit, via transceiver 916, a first SRP (e.g., SRP1) related to apparatus 910 to at least a second communication device (e.g., STA3, STA4 or STA5) associated with apparatus 920 using the first dedicated RU. Furthermore, processor 912 may receive, via transceiver 916, a UL transmission from a first communication device (e.g., STA1 or STA2) associated with apparatus 910 with a transmit power of the UL transmission controlled based on a second SRP related to apparatus 920.

In some implementations, apparatus 910 may be associated with a first BSS (e.g., BSS1) to which the first communication device belongs, and apparatus 920 may be associated with a second BSS (e.g., BSS2) to which the second communication device belongs. In such cases, apparatus 910 may be a first OBSS AP with respect to the second communication device, and apparatus 920 may be a second OBSS AP with respect to the first communication device.

Under a proposed scheme in accordance with the present disclosure, with apparatus 910 implemented in or as AP 120 (e.g., AP1 of BSS1) and apparatus 920 implemented in or as AP 140 (e.g., AP2 of BSS2) of a wireless network such as a WLAN in accordance with one or more of IEEE 802.11 standards, processor 912 of apparatus 910 may reserve a first dedicated RU by performing operations including: (a) dividing a plurality of RUs into a group of one or more shared RUs and a group of one or more dedicated RUs comprising the first dedicated RU; and (b) allocating the group of one or more shared RUs, the group of one or more dedicated RUs, or both the group of one or more shared RUs and the group of one or more dedicated RUs to at least a first communication device. Moreover, processor 912 may transmit, via transceiver 916, a first SRP (e.g., SRP1) related to apparatus 910 to at least a second communication device (e.g., STA3, STA4 or STA5) associated with apparatus 920 using the first dedicated RU. Furthermore, processor 912 may receive, via transceiver 916, a UL transmission from a first communication device (e.g., STA1 or STA2) associated with apparatus 910 with a transmit power of the UL transmission controlled based on a second SRP related to apparatus 920.

In some implementations, apparatus 910 may be associated with a first BSS (e.g., BSS1) to which the first communication device belongs, and apparatus 920 may be associated with a second BSS (e.g., BSS2) to which a second communication device belongs. In such cases, apparatus 910 may be a first OBSS AP with respect to the second communication device, and apparatus 920 may be a second OBSS AP with respect to the first communication device.

In some implementations, apparatus 910 may be associated with a first BSS (e.g., BSS1) to which the first communication device belongs, and apparatus 920 may be associated with a second BSS (e.g., BSS2) to which the second communication device belongs. In such cases, the group of one or more shared RUs may be utilized by both the first BSS and the second BSS for reuse in either or both of a frequency domain and a spatial domain. Moreover, the group of one or more dedicated RUs may be utilized by the first BSS but not the second BSS.

In some implementations, in allocating, processor 912 may allocate in a TXOP by performing certain operations. For instance, processor 912 may divide a plurality of RUs into a group of one or more shared RUs and a group of one or more dedicated RUs comprising the first dedicated RU. Moreover, processor 912 may poll one or more communication devices associated with apparatus 910, including the first communication device, during the TXOP.

In some implementations, in allocating, processor 912 may further perform either a first operation as a master AP or a second operation as a slave AP. In performing the first operation, processor 912 may generate a RU map that specifies RU assignment for apparatus 910 and apparatus 920 regarding DL and UL transmissions. Furthermore, processor 912 may transmit, as the master AP, the RU map to apparatus 920 as the slave AP. In performing the second operation, processor 912 may receive, as the slave AP, the RU map from apparatus 920 as the master AP.

Under a proposed scheme in accordance with the present disclosure, with apparatus 910 implemented in or as one of STAs 110(1)~110(M) (e.g., STA1 or STA2) and apparatus 920 implemented in or as AP 120 (e.g., AP1 of BSS1) of a wireless network such as a WLAN in accordance with one or more of IEEE 802.11 standards, processor 912 of apparatus 910 may receive, via transceiver 916, a second SRP (e.g., SRP2) related to a second apparatus (e.g., AP2 of BSS2) from a first apparatus (e.g., apparatus 920 as AP1) to which apparatus 910 is associated. Moreover, processor 912 may perform, via transceiver 916, a UL transmission to the first apparatus by controlling a transmit power of the UL transmission based on the second SRP.

In some implementations, the first apparatus may be associated with a first BSS (e.g., BSS1) to which apparatus 910 belongs, and the second apparatus may be associated with a second BSS (e.g., BSS2). In such cases, the second apparatus may be an OBSS AP with respect to apparatus 910.

In some implementations, in receiving the second SRP, processor 912 may receive the second SRP in a dedicated RU.

In some implementations, processor 912 may also measure, via transceiver 916, a received power of the second apparatus. In some implementations, the second SRP may indicate a transmit power of the second apparatus and an acceptable receiver interference level of the second apparatus. In such cases, in controlling the transmit power of the UL transmission based on the second SRP, processor 912 may perform certain operations. For instance, processor 912 may determine a power threshold (e.g., $SRP_{OBSS\_AP}$) to be a sum of the transmit power of the second apparatus (e.g., TX $Power_{OBSS\_AP}$) and the acceptable receiver interference level of the second apparatus (e.g., Acceptable Receiver Interference $Level_{OBSS\_AP}$). Moreover, processor 912 may control the transmit power (e.g., STA's TX power) to be less than the power threshold by an amount equal to the received power of the second apparatus (e.g., STA's TX power<$SRP_{OBSS\_AP}$−Received Power of OBSS AP @ STA).

In some implementations, processor 912 may perform additional operations. For instance, processor 912 may receive, via transceiver 916, a poll trigger from the first apparatus during a TXOP. Moreover, processor 912 may transmit, via transceiver 916, a poll response to the first apparatus responsive to receiving the poll trigger. Furthermore, processor 912 may receive, via transceiver 916, from the first apparatus an allocation of a group of one or more shared RUs, a group of one or more dedicated RUs, or both the group of one or more shared RUs and the group of one or more dedicated RUs.

In some implementations, the first apparatus may be associated with a first BSS (e.g., BSS1) to which apparatus 910 belongs, and the second apparatus may be associated with a second BSS (e.g., BSS2). In such cases, the group of one or more shared RUs may be utilized by both the first BSS and the second BSS for reuse in either or both of a frequency domain and a spatial domain. Moreover, the group of one or more dedicated RUs may be utilized by the first BSS but not the second BSS.

In some implementations, in performing the UL transmission, processor 912 may perform certain operations. For instance, processor 912 may perform the UL transmission using at least one dedicated RU of the group of one or more dedicated RUs. Alternatively, processor 912 may perform the UL transmission using at least one shared RU of the group of one or more shared RUs responsive to a predefined condition being satisfied. In some implementations, the predefined condition may include the following: (a) a target RSSI meeting or exceeding a minimum RSSI threshold; and (b) the second SRP being no less than the received power of the second apparatus.

Illustrative Processes

FIG. 10 illustrates an example process 1000 in accordance with an implementation of the present disclosure. Process 1000 may represent an aspect of implementing various proposed designs, concepts, schemes, systems and methods described above. More specifically, process 1000 may represent an aspect of the proposed concepts and schemes pertaining to multi-AP UL collaboration in wireless communications in accordance with the present disclosure. Process 1000 may include one or more operations, actions, or functions as illustrated by one or more of blocks 1010, 1020 and 1030. Although illustrated as discrete blocks, various blocks of process 1000 may be divided into additional blocks, combined into fewer blocks, or eliminated, depending on the desired implementation. Moreover, the blocks/sub-blocks of process 1000 may be executed in the order shown in FIG. 10 or, alternatively in a different order. Furthermore, one or more of the blocks/sub-blocks of process 1000 may be executed repeatedly or iteratively. Process 1000 may be implemented by or in apparatus 910 and apparatus 920 as well as any variations thereof. Solely for illustrative purposes and without limiting the scope, process 1000 is described below in the context of apparatus 910 implemented in or as AP 120 (e.g., AP1 of BSS1) and apparatus 920 implemented in or as AP 140 (e.g., AP2 of BSS2) of a wireless network such as a WLAN in accordance with one or more of IEEE 802.11 standards. Process 1000 may begin at block 1010.

At 1010, process 1000 may involve processor 912 of apparatus 910 receiving, via transceiver 916, a second SRP (e.g., SRP2) related to apparatus 920 from apparatus 920. Process 1000 may proceed from 1010 to 1020.

At 1020, process 1000 may involve processor 912 transmitting, via transceiver 916, the second SRP to at least a first communication device (e.g., STA1 or STA2) associated with apparatus 910. Process 1000 may proceed from 1020 to 1030.

At 1030, process 1000 may involve processor 912 receiving, via transceiver 916, a UL transmission from the first communication device with a transmit power of the UL transmission controlled based on the second SRP.

In some implementations, apparatus 910 may be associated with a first BSS (e.g., BSS1) to which the first communication device belongs, and apparatus 920 may be associated with a second BSS (e.g., BSS2). In such cases, apparatus 920 may be an OBSS AP with respect to the first communication device.

In some implementations, process 1000 may further involve processor 912 transmitting, via transceiver 916, a first SRP (e.g., SRP1) related to apparatus 910 to apparatus 920.

In some implementations, process 1000 may further involve processor 912 other additional operations. For instance, process 1000 may involve processor 912 reserving a first dedicated RU. Moreover, process 1000 may involve processor 912 transmitting, via transceiver 916, a first SRP (e.g., SRP1) related to apparatus 910 to at least a second communication device (e.g., STA3, STA4 or STA5) associated with apparatus 920 using the first dedicated RU. In such cases, apparatus 910 may be an OBSS AP with respect to the second communication device.

FIG. 11 illustrates an example process 1100 in accordance with an implementation of the present disclosure. Process 1100 may represent an aspect of implementing various proposed designs, concepts, schemes, systems and methods described above. More specifically, process 1100 may represent an aspect of the proposed concepts and schemes pertaining to multi-AP UL collaboration in wireless communications in accordance with the present disclosure. Process 1100 may include one or more operations, actions, or functions as illustrated by one or more of blocks 1110, 1120 and 1130. Although illustrated as discrete blocks, various blocks of process 1100 may be divided into additional blocks, combined into fewer blocks, or eliminated, depending on the desired implementation. Moreover, the blocks/sub-blocks of process 1100 may be executed in the order shown in FIG. 11 or, alternatively in a different order. Furthermore, one or more of the blocks/sub-blocks of process 1100 may be executed repeatedly or iteratively. Process 1100 may be implemented by or in apparatus 910 and apparatus 920 as well as any variations thereof. Solely for illustrative purposes and without limiting the scope, process 1100 is described below in the context of apparatus 910 implemented in or as AP 120 (e.g., AP1 of BSS1) and apparatus 920 implemented in or as AP 140 (e.g., AP2 of BSS2) of a wireless network such as a WLAN in accordance with one or more of IEEE 802.11 standards. Process 1100 may begin at block 1110.

At 1110, process 1100 may involve processor 912 of apparatus 910 reserving a first dedicated RU. Process 1100 may proceed from 1110 to 1120.

At 1120, process 1100 may involve processor 912 transmitting, via transceiver 916, a first SRP (e.g., SRP1) related to apparatus 910 to at least a second communication device (e.g., STA3, STA4 or STA5) associated with apparatus 920 using the first dedicated RU. Process 1100 may proceed from 1120 to 1130.

At 1130, process 1100 may involve processor 912 receiving, via transceiver 916, a UL transmission from a first communication device (e.g., STA1 or STA2) associated with apparatus 910 with a transmit power of the UL transmission controlled based on a second SRP related to apparatus 920.

In some implementations, apparatus 910 may be associated with a first BSS (e.g., BSS1) to which the first communication device belongs, and apparatus 920 may be associated with a second BSS (e.g., BSS2) to which the second communication device belongs. In such cases, apparatus 910 may be a first OBSS AP with respect to the second communication device, and apparatus 920 may be a second OBSS AP with respect to the first communication device.

In some implementations, in reserving the first dedicated RU, process 1100 may involve processor 912 performing certain operations. For instance, process 1100 may involve processor 912 dividing a plurality of RUs into a group of one or more shared RUs and a group of one or more dedicated RUs comprising the first dedicated RU. Additionally, process 1100 may involve processor 912 allocating the group of one or more shared RUs, the group of one or more dedicated RUs, or both the group of one or more shared RUs and the group of one or more dedicated RUs to at least the first communication device.

In some implementations, apparatus 910 may be associated with a first BSS (e.g., BSS1) to which the first communication device belongs, and apparatus 920 may be associated with a second BSS (e.g., BSS2) to which the second communication device belongs. In such cases, the group of one or more shared RUs may be utilized by both the first BSS and the second BSS for reuse in either or both of a frequency domain and a spatial domain. Moreover, the group of one or more dedicated RUs may be utilized by the first BSS but not the second BSS.

FIG. 12 illustrates an example process 1200 in accordance with an implementation of the present disclosure. Process 1200 may represent an aspect of implementing various proposed designs, concepts, schemes, systems and methods described above. More specifically, process 1200 may represent an aspect of the proposed concepts and schemes pertaining to multi-AP UL collaboration in wireless communications in accordance with the present disclosure. Process 1200 may include one or more operations, actions, or functions as illustrated by one or more of blocks 1210 and 1220. Although illustrated as discrete blocks, various blocks of process 1200 may be divided into additional blocks, combined into fewer blocks, or eliminated, depending on the desired implementation. Moreover, the blocks/sub-blocks of process 1200 may be executed in the order shown in FIG. 12 or, alternatively in a different order. Furthermore, one or more of the blocks/sub-blocks of process 1200 may be executed repeatedly or iteratively. Process 1200 may be implemented by or in apparatus 910 and apparatus 920 as well as any variations thereof. Solely for illustrative purposes and without limiting the scope, process 1200 is described below in the context of apparatus 910 implemented in or as one of STAs 110(1)~110(M) (e.g., STA2) and apparatus 920 implemented in or as AP 120 (e.g., AP1 of BSS1) of a wireless network such as a WLAN in accordance with one or more of IEEE 802.11 standards. Process 1200 may begin at block 1210.

At 1210, process 1200 may involve processor 912 of apparatus 910 receiving, via transceiver 916, a second SRP (e.g., SRP2) related to a second apparatus (e.g., AP2 of BSS2) from a first apparatus (e.g., apparatus 920 as AP1) to which apparatus 910 is associated. Process 1200 may proceed from 1210 to 1220.

At 1220, process 1200 may involve processor 912 performing, via transceiver 916, a UL transmission to the first apparatus by controlling a transmit power of the UL transmission based on the second SRP.

In some implementations, the first apparatus may be associated with a first BSS (e.g., BSS1) to which apparatus 910 belongs, and the second apparatus may be associated with a second BSS (e.g., BSS2). In such cases, the second apparatus may be an OBSS AP with respect to apparatus 910.

In some implementations, in receiving the second SRP, process 1200 may involve processor 912 receiving the second SRP in a dedicated RU.

In some implementations, process 1200 may further involve processor 912 measuring, via transceiver 916, a received power of the second apparatus. In some implementations, the second SRP may indicate a transmit power of the second apparatus and an acceptable receiver interference level of the second apparatus. In such cases, in controlling the transmit power of the UL transmission based on the second SRP, process 1200 may involve processor 912 performing certain operations. For instance, process 1200 may involve processor 912 determining a power threshold (e.g., $SRP_{OBSS\_AP}$) to be a sum of the transmit power of the second apparatus (e.g., $TX\ Power_{OBSS\_AP}$) and the acceptable receiver interference level of the second apparatus (e.g., Acceptable Receiver Interference $Level_{OBSS\_AP}$). Moreover, process 1200 may involve processor 912 controlling the transmit power (e.g., STA's TX power) to be less than the power threshold by an amount equal to the received power of the second apparatus (e.g., STA's TX power< $SRP_{OBSS\_AP}$–Received Power of OBSS AP @ STA).

In some implementations, process 1200 may further involve processor 912 performing additional operations. For instance, process 1200 may involve processor 912 receiving, via transceiver 916, a poll trigger from the first apparatus during a TXOP. Moreover, process 1200 may involve processor 912 transmitting, via transceiver 916, a poll response to the first apparatus responsive to receiving the poll trigger. Furthermore, process 1200 may involve processor 912 receiving, via transceiver 916, from the first apparatus an allocation of a group of one or more shared RUs, a group of one or more dedicated RUs, or both the group of one or more shared RUs and the group of one or more dedicated RUs.

In some implementations, the first apparatus may be associated with a first BSS (e.g., BSS1) to which apparatus 910 belongs, and the second apparatus may be associated with a second BSS (e.g., BSS2). In such cases, the group of one or more shared RUs may be utilized by both the first BSS and the second BSS for reuse in either or both of a frequency domain and a spatial domain. Moreover, the group of one or more dedicated RUs may be utilized by the first BSS but not the second BSS.

In some implementations, in performing the UL transmission, process 1200 may involve processor 912 performing certain operations. For instance, process 1200 may involve processor 912 performing the UL transmission using at least one dedicated RU of the group of one or more dedicated RUs. Alternatively, process 1200 may involve processor 912 performing the UL transmission using at least one shared RU of the group of one or more shared RUs responsive to a predefined condition being satisfied. In some implementations, the predefined condition may include the following: (a) a target RSSI meeting or exceeding a minimum RSSI threshold; and (b) the second SRP being no less than the received power of the second apparatus.

FIG. 13 illustrates an example process 1300 in accordance with an implementation of the present disclosure. Process 1300 may represent an aspect of implementing various proposed designs, concepts, schemes, systems and methods described above. More specifically, process 1300 may represent an aspect of the proposed concepts and schemes pertaining to multi-AP UL collaboration in wireless communications in accordance with the present disclosure. Process 1300 may include one or more operations, actions, or functions as illustrated by one or more of blocks 1310 as well as sub-blocks 1312 and 1314. Although illustrated as discrete blocks, various blocks of process 1300 may be divided into additional blocks, combined into fewer blocks, or eliminated, depending on the desired implementation.

Moreover, the blocks/sub-blocks of process 1300 may be executed in the order shown in FIG. 13 or, alternatively in a different order. Furthermore, one or more of the blocks/sub-blocks of process 1300 may be executed repeatedly or iteratively. Process 1300 may be implemented by or in apparatus 910 and apparatus 920 as well as any variations thereof. Solely for illustrative purposes and without limiting the scope, process 1300 is described below in the context of apparatus 910 implemented in or as AP 120 (e.g., AP1 of BSS1) and apparatus 920 implemented in or as AP 140 (e.g., AP2 of BSS2) of a wireless network such as a WLAN in accordance with one or more of IEEE 802.11 standards. Process 1300 may begin at block 1310.

At 1310, process 1300 may involve processor 912 of apparatus 910 reserving a first dedicated RU by performing operations represented by 1312 and 1314.

At 1312, process 1300 may involve processor 912 dividing a plurality of RUs into a group of one or more shared RUs and a group of one or more dedicated RUs comprising the first dedicated RU. Process 1300 may proceed from 1312 to 1314.

At 1314, process 1300 may involve processor 912 allocating the group of one or more shared RUs, the group of one or more dedicated RUs, or both the group of one or more shared RUs and the group of one or more dedicated RUs to at least a first communication device.

In some implementations, apparatus 910 may be associated with a first BSS (e.g., BSS1) to which the first communication device belongs, and apparatus 920 may be associated with a second BSS (e.g., BSS2) to which a second communication device belongs. In such cases, apparatus 910 may be a first OBSS AP with respect to the second communication device, and apparatus 920 may be a second OBSS AP with respect to the first communication device.

In some implementations, apparatus 910 may be associated with a first BSS (e.g., BSS1) to which the first communication device belongs, and apparatus 920 may be associated with a second BSS (e.g., BSS2) to which the second communication device belongs. In such cases, the group of one or more shared RUs may be utilized by both the first BSS and the second BSS for reuse in either or both of a frequency domain and a spatial domain. Moreover, the group of one or more dedicated RUs may be utilized by the first BSS but not the second BSS.

In some implementations, in allocating, process 1300 may involve processor 912 allocating in a TXOP by performing certain operations. For instance, process 1300 may involve processor 912 dividing a plurality of RUs into a group of one or more shared RUs and a group of one or more dedicated RUs comprising the first dedicated RU. Moreover, process 1300 may involve processor 912 polling one or more communication devices associated with apparatus 910, including the first communication device, during the TXOP.

In some implementations, in allocating, process 1300 may further involve processor 912 performing either a first operation as a master AP or a second operation as a slave AP. In performing the first operation, process 1300 may involve processor 912 generating a RU map that specifies RU assignment for apparatus 910 and apparatus 920 regarding DL and UL transmissions. Furthermore, process 1300 may involve processor 912 transmitting, as the master AP, the RU map to apparatus 920 as the slave AP. In performing the second operation, process 1300 may involve processor 912 receiving, as the slave AP, the RU map from apparatus 920 as the master AP.

ADDITIONAL NOTES

The herein-described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Further, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Moreover, it will be understood by those skilled in the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various implementations of the present disclosure have been described herein for purposes of illustration, and that various modifications may be made without departing from the scope and spirit of the present disclosure. Accordingly, the various implementations disclosed herein are not intended to be limiting, with the true scope and spirit being indicated by the following claims.

What is claimed is:

1. A method, comprising:
   receiving, by a processor of a first apparatus implemented in a first access point (AP), a second spatial reuse parameter (SRP) related to a second apparatus from the second apparatus implemented in a second AP;
   transmitting, by the processor, the second SRP to at least a first communication device associated with the first apparatus; and
   receiving, by the processor, a uplink (UL) transmission from the first communication device with a transmit power of the UL transmission controlled based on the second SRP,
   wherein the second SRP indicates a transmit power of the second apparatus and an acceptable receiver interference level of the second apparatus,
   wherein the transmit power of the UL transmission is controlled to be less than a power threshold by an amount equal to a received power of the second apparatus, and
   wherein the power threshold is a sum of the transmit power of the second apparatus and the acceptable receiver interference level of the second apparatus.

2. The method of claim 1, wherein the first apparatus is associated with a first basic service set (BSS) to which the first communication device belongs, wherein the second apparatus is associated with a second BSS, and wherein the second apparatus is an overlapping basic service set access point (OBSS AP) with respect to the first communication device.

3. The method of claim 1, further comprising:
   transmitting, by the processor, a first SRP related to the first apparatus to the second apparatus.

4. The method of claim 1, further comprising:
   reserving, by the processor, a first dedicated resource unit (RU);
   transmitting, by the processor, a first SRP related to the first apparatus to at least a second communication device associated with the second apparatus using the first dedicated RU.

5. The method of claim 4, wherein the first apparatus is associated with a first basic service set (BSS), wherein the second apparatus is associated with a second BSS to which the second communication device belongs, and wherein the first apparatus is an overlapping basic service set access point (OBSS AP) with respect to the second communication device.

6. A method, comprising:
   reserving, by a processor of a first apparatus implemented in a first access point (AP), a first dedicated resource unit (RU);
   transmitting, by the processor, a first spatial reuse parameter (SRP) related to the first apparatus to at least a second communication device associated with a second apparatus implemented in a second AP using the first dedicated RU; and
   receiving, by the processor, a uplink (UL) transmission from a first communication device associated with the first apparatus with a transmit power of the UL transmission controlled based on a second SRP related to the second apparatus,
   wherein the first SRP indicates a transmit power of the first apparatus and an acceptable receiver interference level of the first apparatus,
   wherein the transmit power of the UL transmission is controlled to be less than a power threshold by an amount equal to a received power of the second apparatus, and
   wherein the power threshold is a sum of a transmit power of the second apparatus and an acceptable receiver interference level of the second apparatus which are indicated in the second SRP.

7. The method of claim 6, wherein the first apparatus is associated with a first basic service set (BSS) to which the first communication device belongs, wherein the second apparatus is associated with a second BSS to which the second communication device belongs, wherein the first apparatus is a first overlapping basic service set access point (OBSS AP) with respect to the second communication device, and wherein the second apparatus is a second OBSS AP with respect to the first communication device.

8. A method, comprising:
   receiving, by a processor of a communication device, a second spatial reuse parameter (SRP) related to a second apparatus from a first apparatus to which the communication device is associated; and
   performing, by the processor, a uplink (UL) transmission to the first apparatus by controlling a transmit power of the UL transmission based on the second SRP,
   wherein the second SRP indicates a transmit power of the second apparatus and an acceptable receiver interference level of the second apparatus,
   wherein the controlling of the transmit power of the UL transmission based on the second SRP comprises:
      determining a power threshold to be a sum of the transmit power of the second apparatus and the acceptable receiver interference level of the second apparatus, and
      controlling the transmit power to be less than the power threshold by an amount equal to a received power of the second apparatus.

9. The method of claim 8, wherein the first apparatus is associated with a first basic service set (BSS) to which the communication device belongs, wherein the second apparatus is associated with a second BSS, and wherein the second apparatus is an overlapping basic service set access point (OBSS AP) with respect to the communication device.

10. The method of claim 8, wherein the receiving of the second SRP comprises receiving the second SRP in a dedicated resource unit (RU).

11. The method of claim 8, further comprising:
   measuring, by the processor, the received power of the second apparatus.

12. The method of claim 8, further comprising:
receiving, by the processor, a poll trigger from the first apparatus during a transmit opportunity (TXOP); and
transmitting, by the processor, a poll response to the first apparatus responsive to receiving the poll trigger.

13. The method of claim 12, further comprising:
receiving, by the processor, from the first apparatus an allocation of a group of one or more shared resource units (RUs), a group of one or more dedicated RUs, or both the group of one or more shared RUs and the group of one or more dedicated RUs.

14. The method of claim 13, wherein the first apparatus is associated with a first basic service set (BSS) to which the communication device belongs, wherein the second apparatus is associated with a second BSS, wherein the group of one or more shared RUs is utilized by both the first BSS and the second BSS for reuse in either or both of a frequency domain and a spatial domain, and wherein the group of one or more dedicated RUs is utilized by the first BSS but not the second BSS.

15. The method of claim 13, wherein the performing of the UL transmission comprises:
performing the UL transmission using at least one dedicated RU of the group of one or more dedicated RUs; or
performing the UL transmission using at least one shared RU of the group of one or more shared RUs responsive to a predefined condition being satisfied.

16. The method of claim 15, wherein the predefined condition comprises:
a target received signal strength indicator (RSSI) meeting or exceeding a minimum RSSI threshold; and
the second SRP being no less than the received power of the second apparatus.

17. An apparatus implementable in a first access point (AP), comprising:
a transceiver coupled to communicate wirelessly; and
a processor coupled to the transceiver and configured to, via the transceiver, perform operations comprising:
receiving a second spatial reuse parameter (SRP) related to a second apparatus from the second apparatus implemented in a second AP;
transmitting the second SRP to at least a first communication device associated with the first AP; and
receiving a uplink (UL) transmission from the first communication device with a transmit power of the UL transmission controlled based on the second SRP,
wherein the second SRP indicates a transmit power of the second apparatus and an acceptable receiver interference level of the second apparatus,
wherein the transmit power of the UL transmission is controlled to be less than a power threshold by an amount equal to a received power of the second apparatus, and
wherein the power threshold is a sum of the transmit power of the second apparatus and the acceptable receiver interference level of the second apparatus.

18. The apparatus of claim 17, wherein the first AP is associated with a first basic service set (BSS) to which the first communication device belongs, wherein the second apparatus is associated with a second BSS, and wherein the second apparatus is an overlapping basic service set access point (OBSS AP) with respect to the first communication device.

19. The apparatus of claim 17, wherein the processor is further configured to, via the transceiver, perform operations comprising:
transmitting a first SRP related to the first AP to the second apparatus.

20. The apparatus of claim 17, wherein the processor is further configured to, via the transceiver, perform operations comprising:
reserving a first dedicated resource unit (RU);
transmitting a first SRP related to the first AP to at least a second communication device associated with the second apparatus using the first dedicated RU,
wherein the first AP is associated with a first basic service set (BSS), wherein the second apparatus is associated with a second BSS to which the second communication device belongs, and
wherein the first AP is an overlapping basic service set access point (OBSS AP) with respect to the second communication device.

* * * * *